Nov. 12, 1957

C. A. MORSE 2,812,627

ABRADING MACHINE

Filed Dec. 27, 1955

INVENTOR
CHARLES A. MORSE

BY Cushman, Darby & Cushman
ATTORNEYS

Nov. 12, 1957     C. A. MORSE     2,812,627
ABRADING MACHINE

Filed Dec. 27, 1955     5 Sheets-Sheet 3

INVENTOR
CHARLES A. MORSE

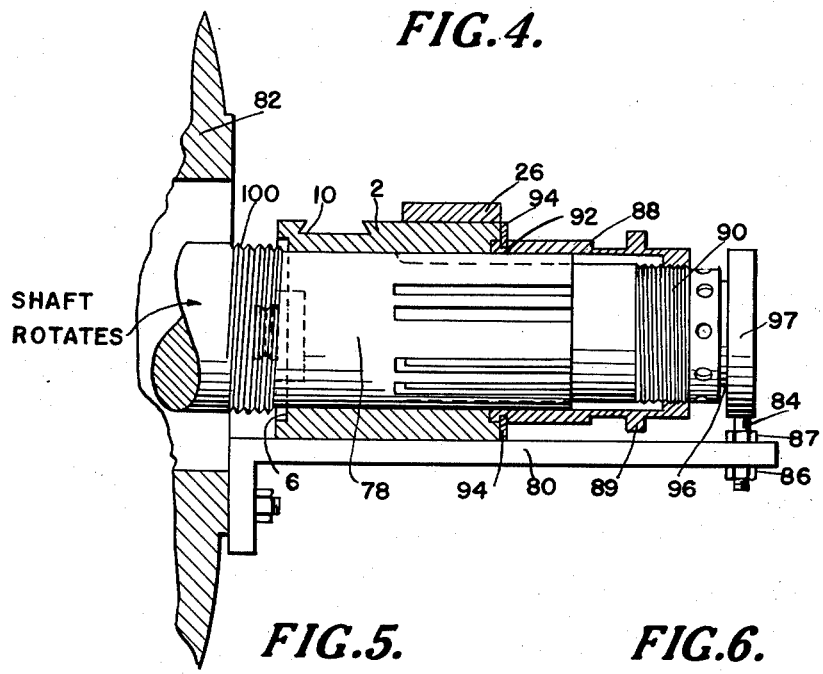
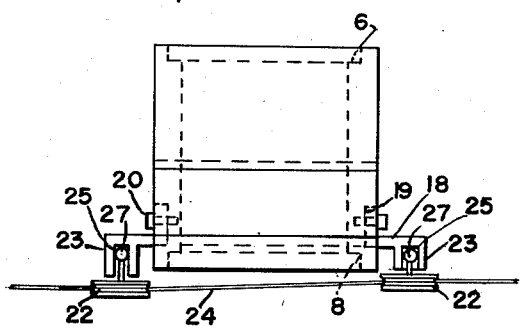
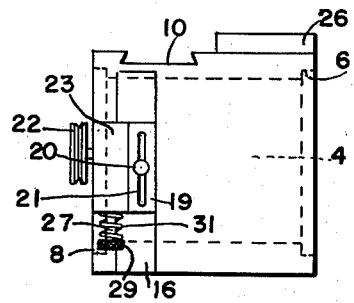
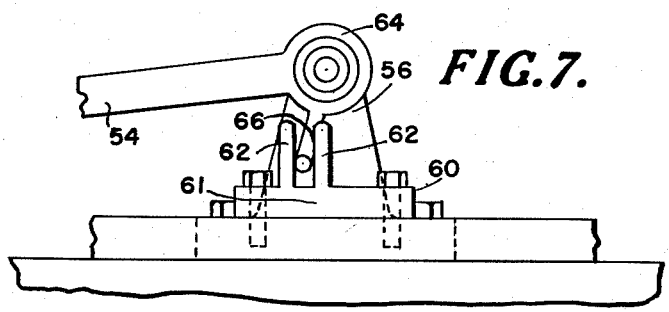

Nov. 12, 1957 C. A. MORSE 2,812,627
ABRADING MACHINE
Filed Dec. 27, 1955 5 Sheets-Sheet 5

INVENTOR
CHARLES A. MORSE

BY Cushman, Darby & Cushman
ATTORNEYS

United States Patent Office 2,812,627
Patented Nov. 12, 1957

2,812,627
ABRADING MACHINE
Charles A. Morse, Houston, Tex.

Application December 27, 1955, Serial No. 555,484

27 Claims. (Cl. 51—241)

The present invention relates to an abrading machine for reworking or reshaping grooves in a cylindrical member. More specifically, the present invention relates to a new and improved method and apparatus for reshaping the roots of threads on a shaft which is subjected normally to high stresses and strains.

It is well known to those skilled in the art that machine elements having indentations or depressions defined by sharp corners or surfaces converging in a line, will rupture in these regions when put under high stresses due to a localization of the stresses in these regions.

In aircraft engines, in particular, excessively high speeds of rotating parts are normal, and the crank shaft in such engines, to which the air screw is attached, should be constructed to eliminate the possibilities of localized stresses due to such surface contours as described above.

In certain types of aircraft engines, the crankshaft is a hollow cylinder composed of very hard steel having external threads thereon, such threads being adapted to receive a thrust bearing nut. This thrust bearing forms the surface against which the propeller hub abuts. These thrust bearing threads on the crankshaft are cut in the usual manner in the form of a V with the roots of such threads being pointed. Due to the high stresses exerted on the crankshaft, fatigue is developed in the shaft which localizes at the point of the V of the thrust bearing threads. This condition results in rupture of the crankshaft and has presented a serious problem to users of such engines. The problem has been solved in the past by manually grinding the thread roots by means of an abrasive cord to make them rounded. This method takes considerable time, is very expensive, and because of human errors, the cutting has not been uniform. For these reasons, it is not a satisfactory solution to the problem. Also, because of the design of the crankshaft, it would be very difficult and expensive to perform the thread reshaping operation on a lathe or other common machine tools. In such tools there would also be present the danger of damaging the crankshaft or perhaps even unbalancing it.

To overcome these objections to prior art methods, it is a primary object of the persent invention to provide an abrading device, employing an abrasive cord, which is simple in design and which will automatically and efficiently rework the roots of threads on an aircraft engine crankshaft, irrespective of whether the crankshaft is assembled in the engine housing or detached therefrom.

Another object of my invention resides in the provision of an abrading machine which is of compact size to be easily transported and economical to manufacture.

A further object of my invention resides in the provision of an abrading machine which permits the workpiece to be readily set up for operation with no danger of damaging the same.

Additional objects and advantages of the present invention will be readily apparent from the following description and claims considered together with the accompanying drawings, in which:

Figure 4 is a longitudinal sectional view of the machine shown in Figure 1 attached to an engine housing with the crankshaft mounted therein;

Figure 5 is a plan view of the mounting block for the workpiece;

Figure 6 is a side elevational view of the mounting block of Figure 5;

Figure 7 is a partial front elevational view of the machine illustrated in Figure 1 showing the driving connections for the members carrying the abrading cord.

Figure 1:
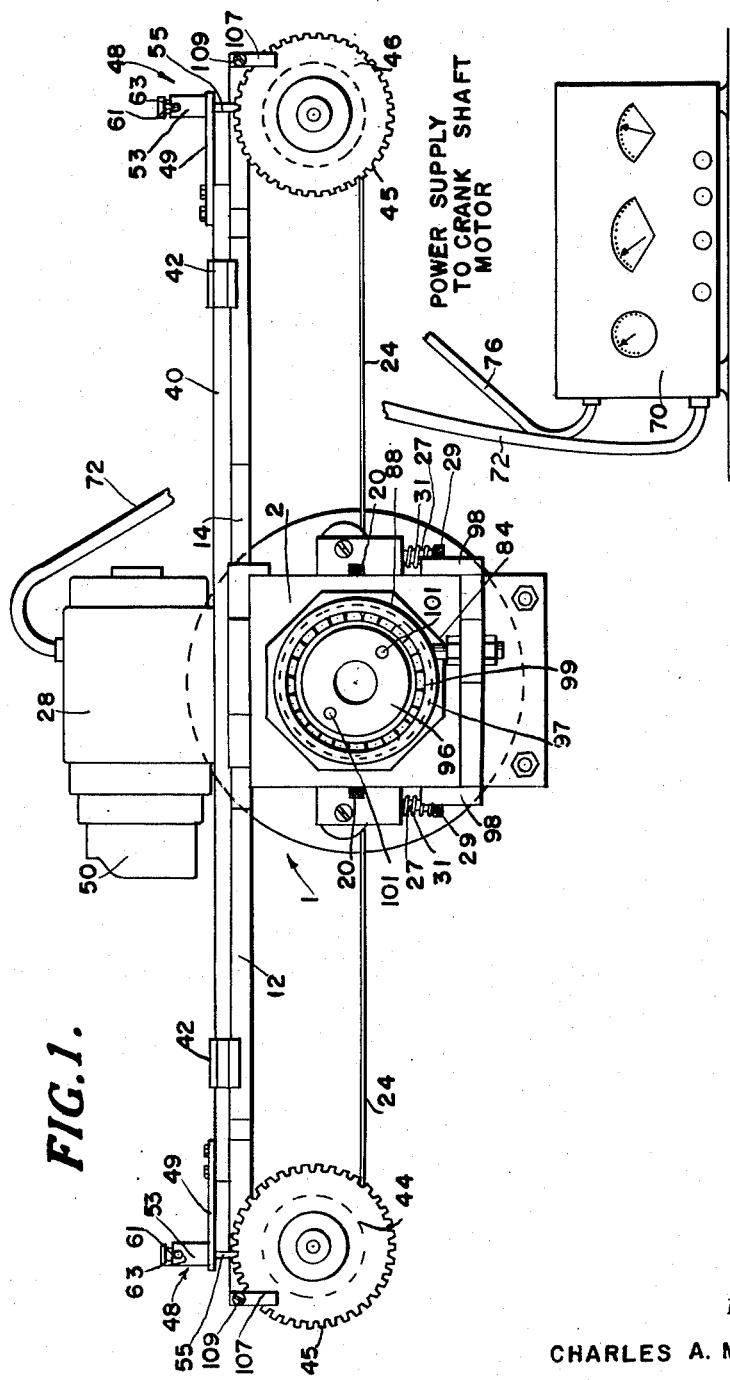
Figure 1 is a front elevational view of the improved abrading machine.

Referring now to the drawings, and particularly Figures 1 and 4–6, the improved abrading machine of the present invention, generally indicated at 1, comprises a mounting block or combined work and tool holder 2 of generally cubical conformation being provided with a centrally disposed bore 4 having counterbored end portions 6 and 8. On the upper face of this mounting block, a dovetail slot 10 is formed for the reception of an elongated bar 12. This bar is provided with a medial portion 14 of generally dovetail shape in transverse cross section and adapted to cooperate with the dovetail slot 10 to restrain the bar from vertical movement with respect to the block but permitting reciprocation thereof with respect to the block. Positioned on opposite side faces of the mounting block are vertically running grooves 16. These grooves are intended to receive angular elements 18 having a base portion 19 provided with an elongated slot 21. The slot cooperates with a bolt 20 to permit vertical adjustment of these elements in the grooves 16. Elements 18 are further provided with a forwardly projecting portion 23 (Figure 5) having a longitudinal cavity 25 therein. These cavities are designed to receive rodlike members or stems 27 extending through a hole in the bottom wall of the structure defining the cavity. A pulley 22 is mounted on each stem at the upper end thereof while the opposite end of the stem has a head portion 29 thereon against which a spring 31 abuts. The other end of these springs abuts the bottom wall of projections 23 and thereby biases the stems and pulleys in a downward direction. These pulleys function as guides for an abrasive cord 24 normally disposed therebeneath. This cord is adapted to operate on the workpiece, and by having the pulleys urged downwardly, a firm contact between the cutting cord and the workpiece is assured. It should be noted that the pulleys may be rotated bodily with the stems to vary angular disposition of the face of the pulley with respect to the axis of the stem.

Figure 2:
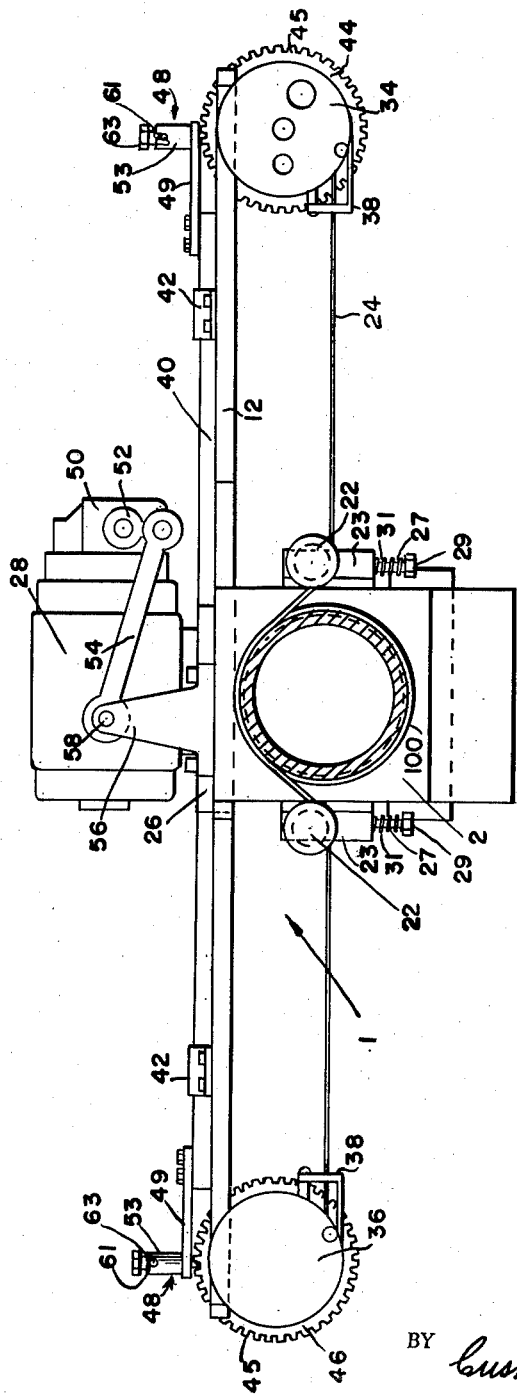
Figure 2 is a rear elevational view of the machine illustrated in Figure 1 and showing the workpiece in section.

Connected to the upper face of the mounting block, adjacent one end thereof, is a base plate 26 upon which a prime mover 28 is mounted, as best seen in Figure 2. The prime mover may be an electric motor and is provided with conventional speed reducing means 50, the latter driving a crank or rocker arm 52 and a connecting rod 54.

The elongated bar 12 extends laterally of the mounting block on either side thereof, terminating in end portions 30, 32 (Figure 3), which portions have reels 34, 36 removably connected thereto. The abrasive cord 24 is wound on these reels, the latter being provided with appropriate followers 38 for said cord to facilitate the winding and unwinding thereof on the reels.

Figure 3:
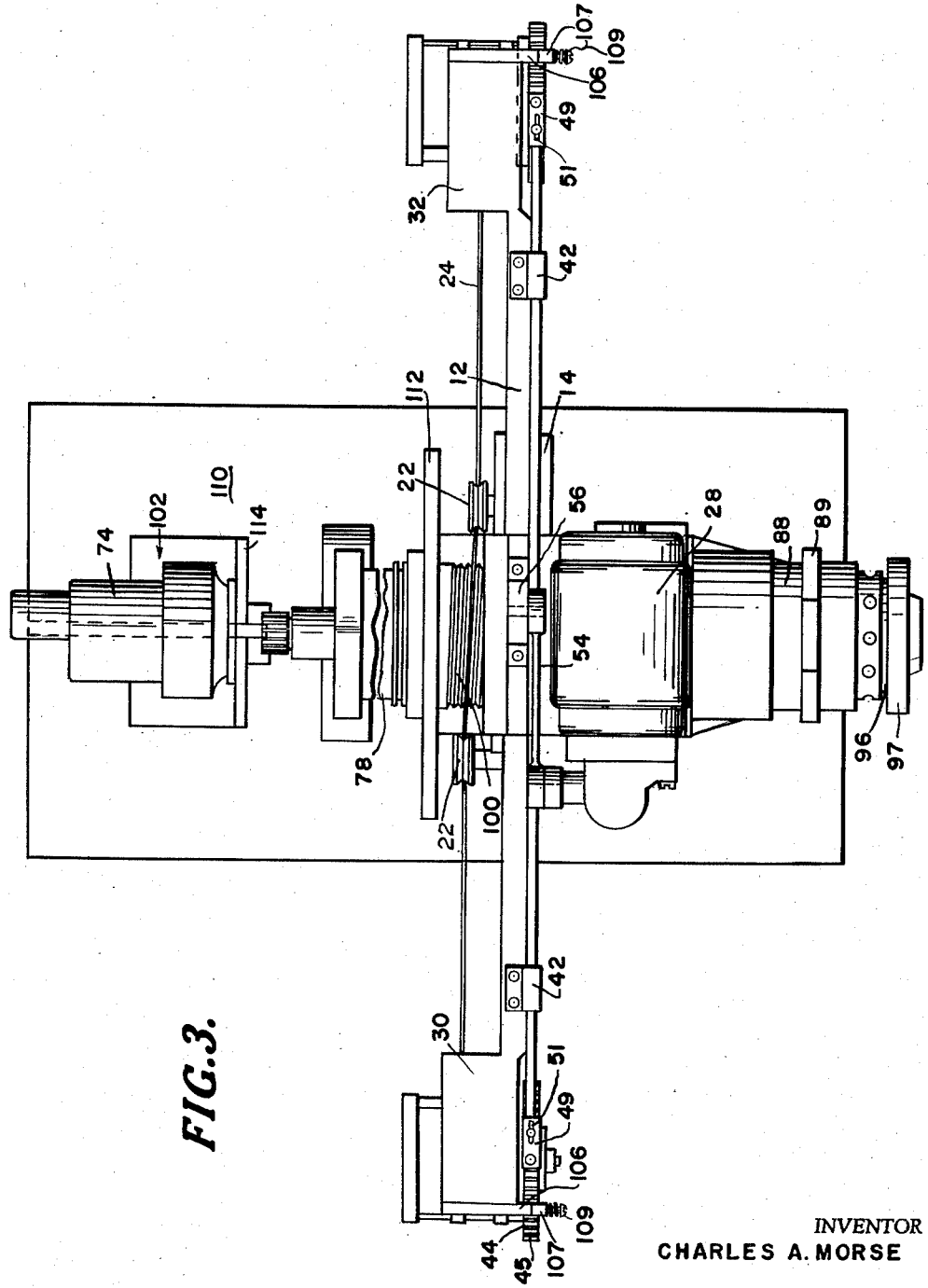
Figure 3 is a plan view showing the improved abrading machine of Figure 1 mounted on a workstand.

A rod 40 is supported on the reel carrying bar 12 for relative reciprocating movement therewith by guiding members 42, the latter being connected to the bar adjacent the end portions thereof, as seen in Figures 1–3.

Referring again to the reels 34, 36, there is coaxially secured to each reel a ratchet wheel 44, 46 having teeth 45. The end portions of the reel carrying bar are provided with braking means 106 having jaw portions 107 (Figure 1) for frictionally contacting the faces of the ratchet wheels. One of these jaws is adjustable axially of the ratchet wheel to vary the braking effect produced thereby. This adjustment is accomplished by means of spring urged screws 109 adapted to adjust the gap between the jaws.

The ratchet wheels are engaged by pawl means 48. As seen in Figures 1–3, the pawl means comprises a plate member 49 having a slot 51 in one end to permit adjustable attachment to the rod 40 at both ends thereof. The other end of the plate members supports a sleeve 53 slidably supporting a pawl 55 therein which is biased downwardly by suitable spring means within the sleeve. The lower end of the pawl is designed in the usual manner to engage the teeth of the ratchet wheel and drive the latter when moved in one direction and when moved in the opposite direction, the pawl will ride over the ratchet teeth. It should be noted here that the brake 106 will offer sufficient resistance to restrain the ratchet wheel from movement when the pawl is riding over the teeth, but such resistance will not be sufficient to prevent movement of the ratchet wheel when the pawl is moved in the positive driving direction.

Attached to the reel carrying bar 12 at substantially the midpoint thereof is a stanchion or post member 56 having a hole 58 disposed in the upper end thereof (Figure 2). The pawl rod 40 is also provided at its midpoint with an upstanding member or stanchion 60. This upstanding member comprises a base 61 and two vertically extending, laterally spaced projections 62 defining a slot therebetween (Figure 7).

The connecting rod 54 terminates at one end in an enlarged circular portion 64 having a circular hole therein, and a lug 66 projecting radially therefrom. The connected rod is adapted to be secured to the stanchion 56 by inserting a rivet or other suitable fastener through the holes in the two parts, with the lug 66 positioned in the slot defined in the upstanding member 60 (Figure 7). With this arrangement, it will be understood that energization of the prime mover will operate to rotate the crank arm which through the connecting rod will impart a reciprocatory motion to the stanchion 56 and the reel carrying bar to which it is connected, which motion is accompanied by a reciprocatory motion of the pawl rod. This latter motion will involve a sliding of the pawl rod on the upper surface of the reel carrying bar which is caused by the loose mounting of the lug projecting from the connecting rod in the slot in the upstanding member 60. In other words, the pawl bar will be driven back and forth by the reciprocating connecting rod at the same frequency as the reel carrying bar, and, in addition to this movement will be further reciprocated by the rotation of the circular enlargement 64 on the connecting rod which causes a swinging of the lug 66. It is this swinging of the lug that results in the relative movement of the pawl rod and reel carrying bar to intermittently drive the reels through the ratchet wheels for feeding the abrasive cord from one reel to the other.

Figure 8:
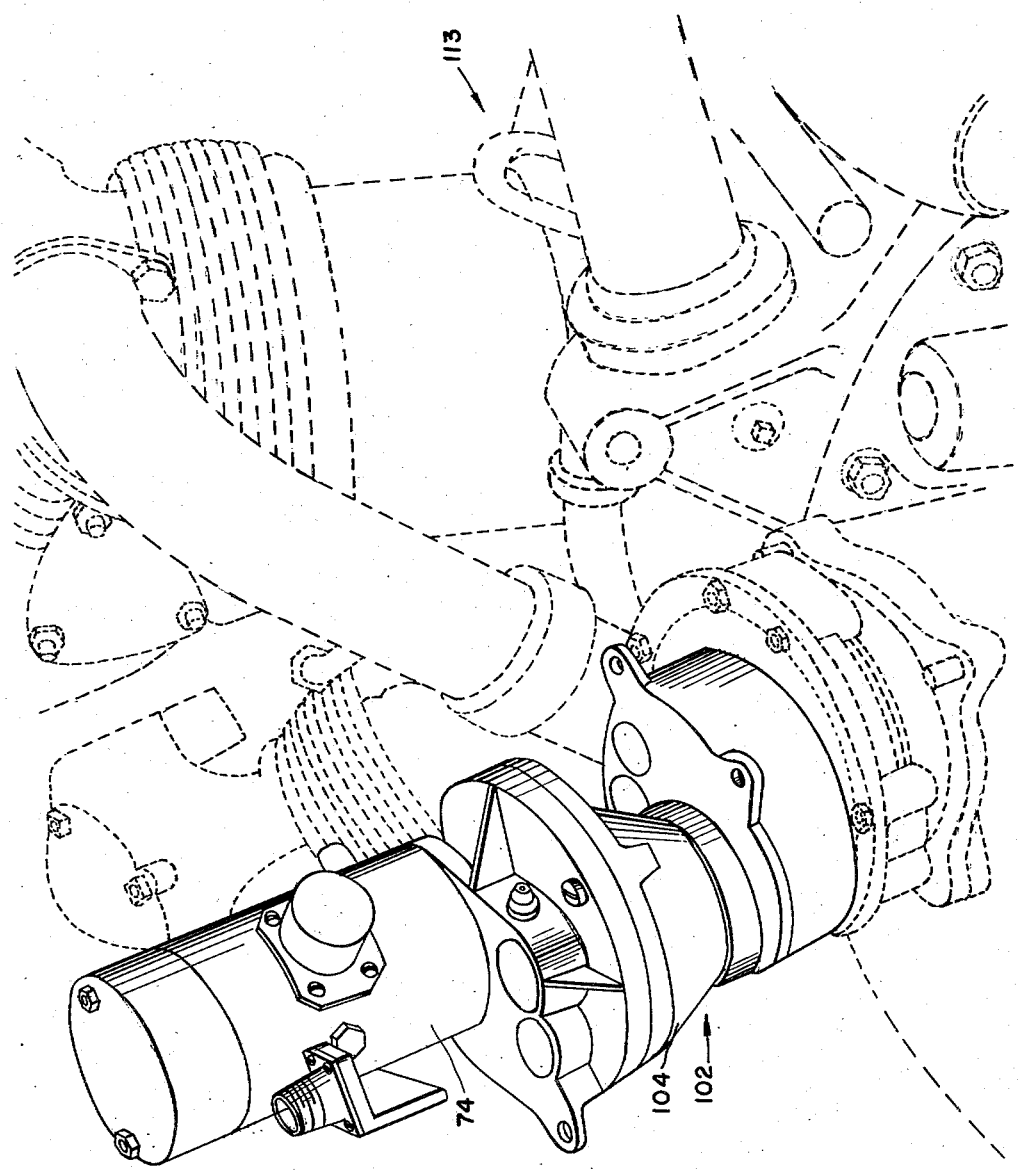
Figure 8 is a perspective view of an attachment for an aircraft engine for rotating the crankshaft therein from an external power source.

Referring now to Figure 1, prime mover 28 is connected to a control box 70 by means of a conductor 72. Also connected to this control box by means of a conductor 76, is a second prime mover 74 (see Figure 8) which is adapted to drive the crankshaft to be worked on when the latter is either in the engine or dismounted therefrom.

The control box 70 is connected to a suitable power source and permits the adjustment of the power supplied to each of the prime movers 28 and 74 to regulate the operation thereof.

Assuming now that it is desired to reshape the threads on an engine crankshaft without dismounting the engine, the abrading unit 1 is attached to the crankshaft 78 (Figure 4) by fitting the latter in the bore 4 of the mounting block 2. This mounting block is supported on a platform 80 which is attached to the engine housing 82 as shown. Disposed at the outer end of the platform 80 is a pin and nut structure 84, 86, 87, whose purpose will be described hereinbelow. After the mounting block has been positioned on the platform embracing the crankshaft, a tubular and elongated control feed nut 88 is threadedly connected to external threads 90 on the crankshaft. This feed nut has one end disposed in the counterbore 6 of the mounting block and is also provided with a peripheral groove 92 which is adapted to receive therein locking plates 94, the latter being removably secured to the mounting block for retaining the feed nut in the counterbore 6 and for preventing any relative rotation between the mounting block and the feed nut. This nut is further provided with a tool receiving portion 89 for manipulation thereof. Also connected to the outermost end of the crankshaft is a centrally bored retaining nut 96, free to rotate with the crankshaft and having a circular head portion 97 journalled thereon by means of a radial bearing member 99 (Figure 1). Blind holes 101 are formed in the retaining nut to permit rotation thereof by an appropriate tool.

The circular head portion on the retaining nut is adapted to contact the pin 84 which is disposed eccentrically thereto, as seen in Figure 1, and which will act as a support therefor and tending to keep the crankshaft properly aligned while rotating. Guard rails 93 are arranged on the sides of platform 80 to engage the side walls of the mounting block for retaining the latter in a fixed transverse position on the platform.

The abrasive cord 24 has an arcuate portion thereof disposed on top of the crankshaft 78 when the mounting block is fitted thereover so that the cord may contact the roots of external threads 100 on the crankshaft, which threads are located near the engine housing (Figures 2 and 4). After the abrading unit has been properly positioned on the crankshaft, the generator structure for the engine 113 is removed and is replaced by an auxiliary crankshaft rotating assembly 102 as indicated in solid lines in Figure 8. This assembly comprises the prime mover 74 and suitable speed reduction means 104 for rotating the crankshaft when the engine is idle. The device is now ready for operation, and upon energization of prime movers 28, 74, the reel carrying bar 12 and the pawl rod 40 are reciprocated to impart a reciprocating or "shoe shine" motion to the abrasive cord as it rides in the thread roots, rounding out such roots. This reciprocating motion of the abrasive cord is accompanied by an intermittent feeding thereof caused by the relative reciprocation of the pawl rod on the reel bar which drives the pawls 48 which, in turn, intermittently drive the ratchet wheels for rotating the reels. The ratchet wheels will be driven in a counterclockwise direction, as viewed in Figure 2, to wind the cord on reel 34 and thereby continually feed fresh or unused portions of the abrasive cord into cutting position. It is to be understood that after the abrasive cord has been completely unwound, a new reel of abrasive cord may be substituted for the reel of used cord and the pawls 55 rotated through 180° so that the drive will be reversed and the ratchet wheels will rotate in a clockwise direction. To enable the pawls to be rotated in this manner, diametrically opposed notches 61 are formed in sleeves 53 to receive pins 63 constructed on the upper part of the pawls 55. Obviously, if it is to be desired to use the same cord more than once, all that is necessary is that the drive be reversed.

Since the proper grinding of the thread roots demands that the abrasive cord be disposed parallel to the helix angle of such threads, one of the cord guides 22 may be positioned axially forwardly of the other cord guide, as seen in Figures 3 and 5. It is to be understood that an alternate structure for this purpose would involve disposing the dovetail slot in the mounting block at the same angle with respect to the longitudinal axis of the mounting block as the thread helix and disposing the pulleys in planes parallel to the helix angle, or the bore in the mounting block may be offset to dispose the helix of the threads parallel to an end face of the block, in which latter case, the guide pulleys may be positioned in a plane parallel to said end face.

Considering again the operation of the device, as the abrasive cord is being reciprocated and intermittently fed across the crankshaft, the latter is being rotated by the prime mover 74 at a suitable speed to cause the control feed nut 88 to be moved axially with respect to the crankshaft. This movement of the feed nut 88 causes the mounting block 2 to be correspondingly moved so that the abrasive cord carried thereby may traverse the entire helical distance defined by the threads being ground.

If it is desired to rework threads on a crankshaft dismounted from the engine, a workstand 110 is provided as seen in Figure 3. This stand comprises vertical supporting members 112, 114 having openings therein for the reception of the crankshaft and the structure for driving the same. The forward end of the crankshaft projects through support 112 with the platform 80 connected subjacent thereto. The abrading unit is then fitted over the crankshaft and assembled therewith on the platform member in the same manner as was described in connection with the mounting on the engine housing. The crankshaft driving means 102 is attached to the rear support 114 on the workstand and is drivingly associated with the crankshaft. This rear support is adjustable longitudinally of the workstand to accommodate crankshafts of various sizes.

The operation of the device on the workstand is the same as that described above with respect to the engine housing.

Since it is only the roots of these threads that are to be ground, the diameter of the abrasive cord is chosen so that the sides of the threads will receive no grinding action, permitting the same parts to be threaded on the crankshaft after this grinding operation as before.

As was stated hereinbefore, the control box 70 permits the regulation of the power supplied to each prime mover so that the speed of the grinding operation and the various motions of the abrasive cord may be varied to produce a coarser or finer surface as desired.

The abrasive cord may be of any suitable material either possessing abrasive properties in itself or impregnated with an abrasive material.

It is to be understood that while my invention has been described herein as applied to aircraft engine crankshafts, it will be obvious to those skilled in the art that it may be applied to any cylindrical member having external grooves or threads thereon which are to be polished or ground either in the roots or the sides thereof.

Although my invention has been set forth in considerable detail, I do not wish to be limited to the exact and specific structures shown and described herein, but substitutions, modifications and equivalents may be employed and still remain within the scope of my invention as set forth in the appended claims.

Having thus described my invention, what I claim as new and desire to protect by Letters Patent is:

1. A method of reworking threads on a cylindrical member comprising the steps of rotating said cylindrical member, simultaneously reciprocating an abrasive cord in contact with said threads on said cylindrical member, and imposing on said reciprocatory motion of said cord a feeding motion comprising a relatively axial movement thereof with respect to said cylindrical member to permit the helical distance defined by said threads to be traversed by said cord.

2. A method of reworking threads on a cylindrical member comprising the steps of rotating said cylindrical member, reciprocating an abrasive cord in contact with said threads, and imposing on said reciprocatory motion of said cord a feeding motion comprising a relatively circumferential movement thereof with respect to said cylindrical member to present unused portions of said cord to the surface of the threads.

3. A method of reworking roots of threads on a cylindrical member as defined in claim 2 wherein said relatively circumferential feeding movement of said cord is intermittent.

4. A method of reworking threads on a cylindrical member comprising the steps of rotating said cylindrical member, disposing an abrasive cord transversely to said cylindrical member and parallel to the helix angle of said threads, and reciprocating said abrasive cord in contact with said threads.

5. A method of reworking threads on a cylindrical member as defined in claim 4 wherein said abrasive cord is put under tension and engages said cylindrical member in an arc subtending an acute angle.

6. A method of reworking roots of threads on a cylindrical member as defined in claim 4 wherein there is imposed on said reciprocatory motion of said cord a feeding motion comprising a relatively radial, intermittent movement thereof with respect to said cylindrical member to present unused portions of said cord to the surface of said threads.

7. A method of reworking roots of threads on a cylindrical member as defined in claim 4 wherein there is imposed on said reciprocatory motion of said cord a feeding motion comprising a relatively axial movement thereof with respect to said cylindrical member to permit the helical distance defined by said threads to be traversed by said cord.

8. A method of reworking threads on a cylindrical member comprising the steps of rotating said cylindrical member, reciprocating an abrasive cord in contact with said threads, imposing on the reciprocatory motion of the abrasive cord a feeding motion thereof comprising a relatively circumferential movement thereof with respect to said cylindrical member to present unused portions of said cord to the surface of said thread roots and said feeding motion also comprising a relatively axial movement of said cord with respect to said cylindrical member.

9. In a device for reworking grooves on a cylindrical member, means for holding said cylindrical member, reels disposed on opposite sides of said cylindrical member, an abrasive cord wound on said reels and extending therebetween, a portion of said cord being disposed in a groove on said cylindrical member, means for reciprocating said cord in said grooves and means for winding said cord from one of said reels onto the other.

10. A device as set forth in claim 9 wherein means are provided for rotating said cylindrical member and guide means for said cord are arranged on either side of said cylindrical member holding means.

11. In a device for reworking grooves on a cylindrical member, means for holding said cylindrical member, means for supporting an abrasive cord transversely of the axis of said cylindrical member with a portion of said cord disposed in a groove in said cylindrical member, means for rotating said cylindrical member, means for reciprocating said abrasive cord in said groove and means for feeding said cord circumferentially with respect to said cylindrical member to present unused portions of said cord to said groove.

12. A device as set forth in claim 11 wherein said reciprocating means comprises an elongated member slidably mounted on said holding means, and said supporting means for said cord comprises reels connected to said elongated member on opposite sides of said cylindrical member.

13. A device as set forth in claim 12 wherein said cord feeding means includes a ratchet wheel associated with at least one of said reels and further includes a pawl slidably disposed on said elongated member and engaging said ratchet wheel.

14. A device for reworking threads on a cylindrical member comprising means for holding said cylindrical member leaving threads thereon exposed at either end of said holding means, means attached to one end of said holding means and threadedly connected to the threads on said cylindrical member adjacent said one end, an abrasive element positioned adjacent the other end of said holding means and disposed in the threads on said member adjacent said other end, means for rotating said cylindrical member whereby the means threaded thereto and the holding means are moved axially thereof.

15. A device as set forth in claim 14 wherein means are provided for reciprocating said abrasive element, said last named means being mouned on said holding means for axial movement therewith whereby as said holding means moves axially of said cylindrical member, the helix defined by the threads on said member at said other end is traversed by said abrasive element.

16. A device as set forth in claim 15 wherein said abrasive element reciprocating means comprises an elongated bar disposed transversely of said cylindrical member, said bar having a reel at each end thereof on opposite sides of said member, said cord being arranged on said reels and means for winding said cord on one of said reels simultaneously with the reciprocation thereof.

17. A device for shaping threads on a shaft comprising means for embracing a shaft and leaving threads thereon exposed at one end of said means, an abrading means slidably mounted on said embracing means adjacent said one end thereof, said abrading means comprising an elongated member, a supply reel disposed at one end of said member on one side of said embracing means and a take-up reel disposed at another end of said member on the other side of said embracing means, an abrasive cord associated with said reels and extending across said one end of said embracing means and adjacent thereto, guiding means on said embracing means to engage said cord and tensionally retain the latter in the exposed threads of the shaft, means for reciprocating said elongated member, and means for rotating the shaft to effect a grinding action between the abrasive cord and the threads on the shaft.

18. A device for reworking threads on a cylindrical member comprising a work engaging means and an abrading means; said work engaging means comprising a block-like element having a bore therein adapted to receive a cylindrical member having external threads thereon disposed adjacent to and exteriorly of one end of said bore when said cylindrical member is mounted therein; said abrading means being attached to said block adjacent said one end of said bore and comprising a supply reel and a take-up reel disposed on opposite sides of said bore, an abrasive cord associated with said reels and engageable with the threads on the cylindrical member; said device further comprising means for reciprocating said cord in the threads to be ground, means for rotating the cylindrical member, and means cooperating with said cylindrical member and said rotating means for effecting an axial movement of said work engaging means with respect to said cylindrical member.

19. A device for reworking threads on a cylindrical member comprising means for holding a cylindrical member to be worked on, a first member slidably mounted on said means and projecting laterally from either side thereof, a reel attached to each end of said first member, at least one of said reels having a ratchet means connected therewith, an abrasive cord extending between said reels and arranged thereon and adapted to contact a cylindrical member to be worked on, a second member slidably mounted on said first member, at least one end of said second member having pawl means thereon engaging said ratchet means, and driving means associated with said first and second members to reciprocate the latter members whereby said reels and abrasive cord are reciprocated relative to said holding means and said pawl means imparts a step-by-step movement to said ratchet means to feed the abrasive cord from one of said reels to the other.

20. A device as set forth in claim 19 wherein said holding means comprises a slot arranged on one surface thereof, and said first member being provided with a portion adapted to be disposed in said slot, said first member further being provided with means adjacent said reels adapted to engage said second member and retain the latter thereon.

21. A device as set forth in claim 19 wherein each of said first and second members comprises a stanchion mounted thereon, and said driving means being journalled in one of said stanchions and loosely mounted in the other of said stanchions whereby said first and second members are relatively reciprocated with respect to each other.

22. The structure defined in claim 11 wherein said cord engages said cylindrical member in an arc subtending an angle of approximately 60°.

23. The structure defined in claim 17 wherein said abrasive cord engages said cylindrical member in an arc subtending an angle of approximately 60°.

24. The structure defined in claim 17 wherein at least a portion of said abrasive cord is disposed at an angle to the axis of said shaft substantially equal to the helix angle of the threads on said shaft.

25. A device for reworking threads on an aircraft engine crankshaft disposed externally of the engine housing, said device comprising: supporting means attached to the engine housing, a mounting block on said supporting means drivingly associated with the crankshaft, a first member slidably mounted on said block and projecting laterally from either side thereof, a reel attached to each end of said first member, at least one of said reels having a ratchet means connected thereto, an abrasive cord extending between said reels and arranged thereon, guiding means on said mounting block engaging said cord on opposite sides of the crankshaft and urging said cord into the exposed threads of the crankshaft, pawl means on said first member engaging said ratchet means, first driving means associated with said first member and said pawl means, second driving means drivingly associated with the crankshaft and engaged to the engine housing, and a common control means for said first and second driving means.

26. The structure defined in claim 25 wherein said abrasive cord engages the crankshaft throughout an arc subtending an angle of approximately 60°.

27. The structure defined in claim 25 wherein said guiding means comprises a pulley arranged on each side of said mounting block.

No references cited.